Aug. 8, 1944.  R. T. BURNETT  2,355,143
BRAKE
Filed April 13, 1942  2 Sheets-Sheet 1
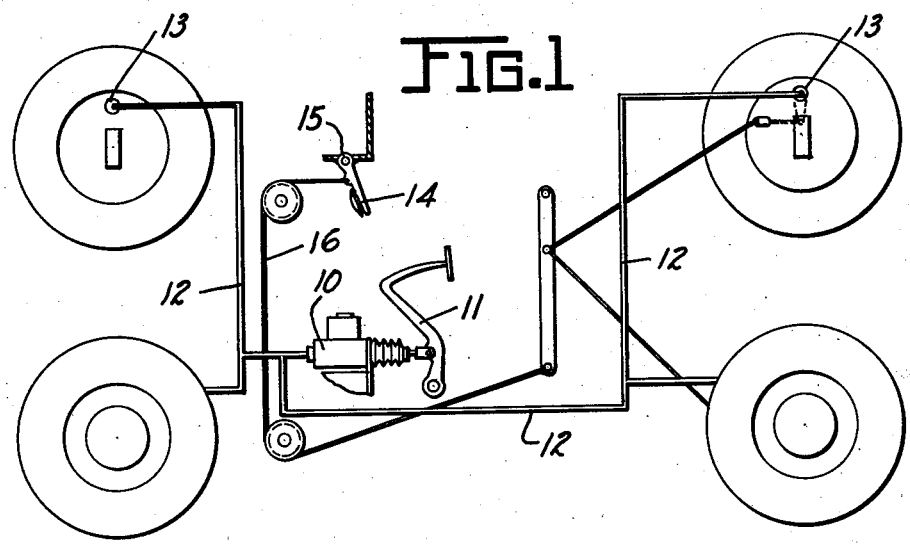
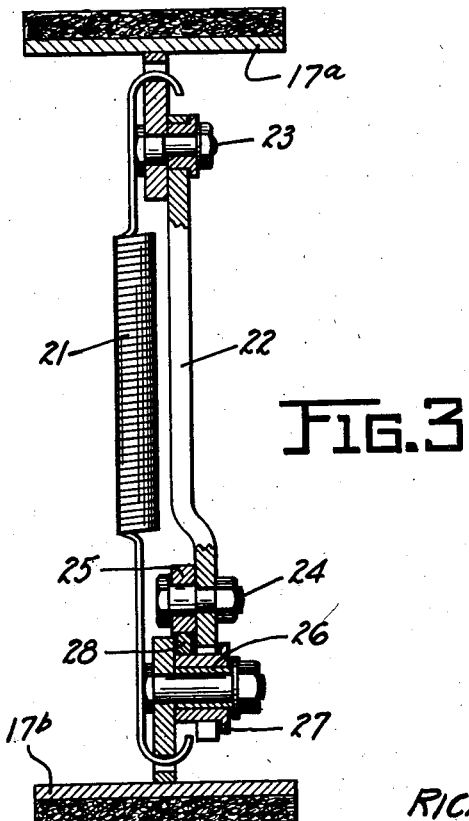
INVENTOR.
RICHARD T. BURNETT
BY
ATTORNEY.

Patented Aug. 8, 1944

2,355,143

UNITED STATES PATENT OFFICE 2,355,143

BRAKE

Richard T. Burnett, South Bend, Ind., assignor to Bendix Aviation Corporation, South Bend, Ind., a corporation of Delaware Application April 13, 1942, Serial No. 438,730

10 Claims. (Cl. 188—106)

This invention relates to brakes of the internal shoe drum brake type and particularly to mechanical linkage used for moving the brake shoes against the brake drum.

The proper positioning of brake shoes in release demands not only that they be normally held at the proper radial distance from the center of the brake and therefore at the proper distance from the brake drum, but also that the arc of each shoe be concentric to the center of the brake so that neither end of the shoe will tend to grab or drag against the rotating brake drum.

In practically all brake assemblies of the present day the brake shoes are positioned vertically, i. e., a line drawn from one end to the other of a given shoe would be substantially vertical. Owing to this vertical positioning some support must be provided to prevent the weight of the shoes from pulling them to the bottom of the brake assembly and to a position eccentric to the center of the brake. In some brakes this support for the shoes may be provided by pivoting them at one end, while in other brakes of the shiftable anchorage type the support may be provided by having one end of each shoe notched to receive an anchor mounted on the backing plate. In brakes of the type having a plurality of individually shiftable shoes which anchor at one end or the other during brake application depending on the direction of drum rotation, the problem of holding the shoes concentric to the drum while they are in released position is particularly difficult.

It has been found that the proper concentric positioning of the shoes in release may be relatively easily accomplished when the shoes are horizontal in the brake assembly, i. e., a line drawn from one end to the other of a given shoe will be approximately horizontal. Horizontal positioning of the shoes raises a further problem, the elimination of which is the chief object of this invention. That problem has to do with the provision of mechanical means for moving the shoes against the brake drum. Practically all brakes in general use at the present time have hydraulic means for accomplishing the service or customary actuation of the brakes, while they have mechanical means for accomplishing the auxiliary actuation of the brakes, the mechanical means being variously referred to as the emergency brake, the parking brake, etc.

In the case of brakes having vertically extending shoes, the auxiliary mechanical actuation is customarily accomplished by a horizontal strut pivoted on one shoe near the end thereof and a vertical lever pivoted on the other shoe near the end thereof and pivotally connected to the strut, the free end of the lever being swung by a cable which extends along a substantially horizontal line. Owing to the fact that the auxiliary mechanical brake usually actuates the brakes at the rear wheels of an automotive vehicle and that the operator's lever for controlling the auxiliary mechanical brake must be near the front of the vehicle, it is necessary from a practical standpoint that the movement of the cable, or other element which might be substituted therefor, and the force exerted thereby must be along a line approximating the horizontal. If, in a brake having horizontal shoes, a strut and lever construction of the type described were used, the cable or substitute connection would have to be drawn along a line approximating the vertical. This is particularly true because of the limitations upon the design of the auxiliary mechanical braking device owing to the necessity of keeping the center of the brake assembly as free and open as possible. This necessity of keeping the center of the brake unencumbered makes it desirable to have both the strut and the lever, or other means used to actuate the strut, extending along a line as close as possible to the side of the brake assembly, i. e. as close as possible to the cylindrical friction surface of the brake drum, while at the same time the strut and the lever, or other strut actuating means, must be at approximately right angles to one another.

I have devised a brake having horizontally extending shoes and at the same time having a horizontally extending cable for controlling the auxiliary mechanical actuation of the brake. I have simplified the auxiliary mechanical connections by eliminating the customary lever entirely and utilizing a wedge shaped device connected to the cable which exerts a force tending to spread the ends of a pair of shoes by means of wedging action between one of the shoes and a strut pivoted on the other shoe.

In addition to providing a mechanical brake applying means which accomplishes the objects set out above, I have provided such a brake applying means which is extremely simple in construction and inexpensive to build because it involves relatively few parts.

Other objects and features of my invention will become apparent during the following description wherein reference is had to the accompanying drawings, in which:

Fig. 1 is a diagrammatic showing of the customary hydraulic braking system of an automotive vehicle in combination with which my invention may be utilized;

Fig. 3 is a section taken on the line 3—3 of Fig. 2.

Figure 2:
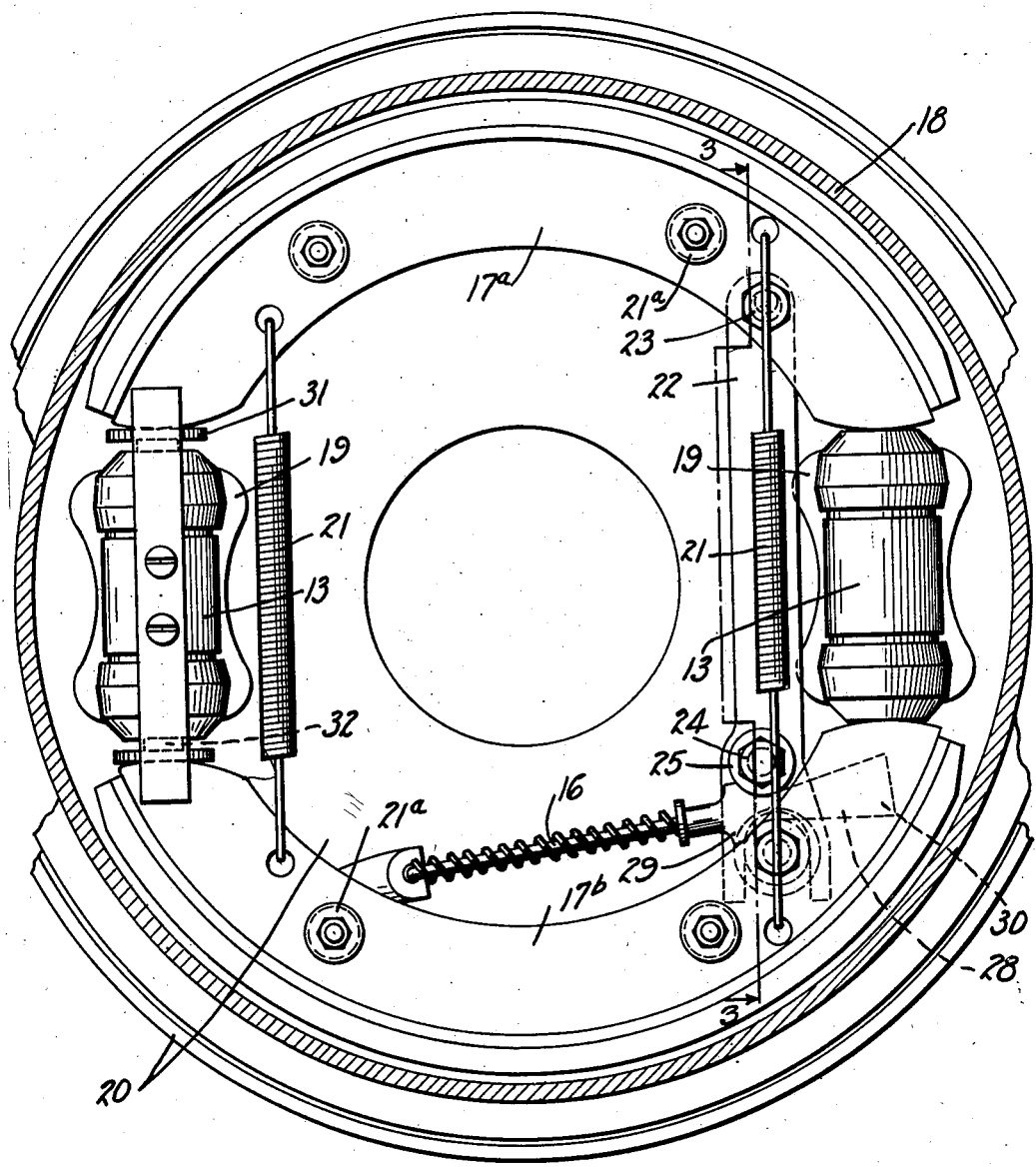
Fig. 2 is a vertical section taken through a brake assembly incorporating my invention on a plane just inside the head of the brake drum showing the brake shoes and applying means therefor in side elevation.

The vehicle braking system shown in Fig. 1 comprises both a hydraulic braking system and a mechanical braking system, the hydraulic system being chosen as particularly desirable for operating the service brake, while the mechanical system is particularly desirable for operating the parking or emergency brake. The hydraulic braking system comprises a master cylinder 10, a pedal 11 for operating the master cylinder, a plurality of conduits 12 connected to the master cylinder, and a plurality of hydraulic motors 13 connected to the conduits and adapted to apply the vehicle brakes by spreading the brake shoes against the brake drums. The hydraulic motors 13 may be seen clearly by referring to Fig. 2. The mechanical braking system may comprise a hand lever 14 pivoted on the vehicle frame at 15 and connected by a cable 16 to the mechanical means for spreading the brake shoes. The end of the cable 16 remote from the operating lever 14 may be seen in Fig. 2.

The actual brake applying assembly, as shown in Fig. 2, may comprise a pair of horizontally extending brake shoes 17a and 17b, 17a being the upper shoe and 17b the lower shoe. The brake assembly shown in Fig. 2 includes two hydraulic motors 13, one being positioned at each side of the brake between the ends of the brake shoes. It will of course be understood that mechanical operating means or other brake applying means might be substituted for the hydraulic motors 13 without departing from the scope of my invention. Suffice it to say that the hydraulic motors 13 are adapted, when subjected to pressure in the master cylinder 11 to simultaneously exert an applying force at both ends of both shoes tending to move the shoes toward the rotatable brake drum 18. The hydraulic motors 13 may also be utilized, as shown in this illustration, as anchors for the shoes 17a and 17b. The motors 13 are solidly mounted by means of brackets 19 on a non-rotatable backing plate on support member 20. After the shoes have been moved into contact with the brake drum, friction between the shoes and the drum tends to carry the shoes along with the drum in whatever direction the drum is rotating with the result that each shoe will anchor against one of the hydraulic motors 13. When the direction of rotation of the drum is forward each shoe will anchor at one end thereof and when the direction of rotation of the drum is rearward each shoe will anchor at the other end thereof.

The shoes may be normally retained in released position with one end of each shoe resting against each of the motors 13 by means of a plurality of return springs 21 stretched vertically from one shoe to the other. By holding the shoes against the motors 13 when the shoes are in released position, the springs 21 maintain the arcs of the shoes concentric with the brake drum and the center of the brake assembly. The weight of the shoes does not, as in the case of vertically extending shoes, tend to move the shoes to positions eccentric from the brake drum and the center of the brake assembly. This is particularly important because, as is obvious, the ends of the brake shoes are permitted to slide along their anchors toward or away from the brake drum, this sliding being desirable in order to allow the shoes to automatically position themselves most effectively during brake application, when they are in frictional contact with the brake drum. In order to prevent excessive lateral movement of the shoe toward and away from the backing plate 20 and to likewise aid in positioning the shoes concentric of the brake drum, a plurality of hold-down pins 21a may be provided to hold the shoes against the backing plate.

The brake actuating linkage may comprise a strut 22 pivoted to the web of shoe 17a near one end thereof by any suitable means, as for example an eccentric pin 23. (Note Fig. 3.) The pin 23 is preferably made eccentric so that initial adjustment of the brake actuating linkage may be accomplished by altering the position of the strut 22. The strut 22 preferably extends along a substantially vertically line toward the shoe 17b. Adjacent its lower end the strut has a pin 24 secured thereto and supporting a roller 25 (see Fig. 3.) Adjacent the pin 24 and roller 25, the web of shoe 17b is provided with a bolt-held abutment 26 which supports a roller 27. Inserted between rollers 25 and 27 and connected to the end of cable 16 is a wedge 28. The narrow portion of the wedge is arranged to fit between the rollers 25 and 27, and the body of the wedge gradually increases in width toward the end thereof so that a pull exerted by the cable 16 will draw the wedge 28 between the rollers 25 and 27 exerting a force tending to spread shoes 17a and 17b, the force being exerted on shoe 17b through roller 27 and abutment 26 and on shoe 17a through roller 25, pin 24, strut 22 and pin 23. When applied by the cable and wedge mechanism, the shoes will spread at their right end and both shoes will pivot at their left end, so that the brake application accomplished by the cable and wedge is similar to that of a non-servo or two-pivoted shoe brake. The wedge 28 is maintained in normal position when the brakes are released by means of a flange 29, cooperating with the body 30 of the wedge prevents longitudinal movement thereof, and by the web of shoe 17b and the lower end of strut 22 which, one on each side of the wedge, prevent it from undue lateral movement and maintain it in position between the rollers 25 and 27 (see Fig. 3.) Adjustment for wear of the brake shoes may be made from time to time by turning the ratchet heads 31 of the adjusting screws 32 to move the ends of the shoes outwardly toward the brake drum. It will be noted that both adjusting screws 32 are associated with the same hydraulic motor and that all adjustments are made at the side of the brake opposite the mechanical wedge and strut for actuating the brake shoes. This placing of the adjusting device is desirable in order that adjustment will not be required both for the service brake and separately for the parking brake. In cases where adjustment of the service brake causes the shoes to move away from the parking brake parts, a separate adjustment is necessary in the length of the parking brake cable.

It will be apparent from the above description that I have provided a brake having horizontally extending shoes and at the same time having mechanically operated mechanism for spreading the shoes in which the force exerted by the operator may pull directly through a horizontally extending cable to cause the movement of the brake shoes against the brake drum.

Although a single illustrative embodiment of my invention has been described, it is not my intention to limit the scope of my invention to the embodiment described or otherwise than by the terms of the appended claims.

What I claim is:

1. A brake assembly comprising a rotatable brake drum, two individually shiftable brake shoes, service brake means for substantially simultaneously applying force to both ends of both shoes tending to move them toward the brake drum, and auxiliary brake means for moving one end of each shoe toward the brake drum, said auxiliary brake means including a thrust link pivoted on one shoe and having an abutment adjacent the other shoe, an abutment on the other shoe, a wedge between the two abutments for spreading the shoes when moved in a given direction, and a cable for moving the wedge to spread the shoes.

2. A brake assembly comprising a rotatable brake drum, two individually shiftable brake shoes, combined anchoring and applying means for substantially simultaneously applying force to both ends of both shoes tending to move them toward the brake drum and for receiving anchoring torque of the shoes during brake application, and auxiliary brake means for moving one end of each shoe toward the brake drum, said auxiliary brake means including a thrust link pivoted on one shoe and having an abutment adjacent the other shoe, an abutment on the other shoe, a wedge between the two abutments for spreading the shoes when pulled, and a cable for pulling the wedge to spread the shoes.

3. A brake assembly comprising a rotatable brake drum, two individually shiftable brake shoes each having its ends on a substantially horizontal line, combined anchoring and applying means for substantially simultaneously applying force to both ends of both shoes tending to move them toward the brake drum and for receiving anchoring torque of the shoes during brake application, and auxiliary brake means for moving one end of each shoe toward the brake drum, said auxiliary brake means including a substantially vertical thrust link pivoted on one shoe and having an abutment adjacent the other shoe, an abutment on the other shoe, a wedge movable between the two abutments on a substantially horizontal line for spreading the shoes when pulled, and a cable for pulling the wedge to spread the shoes.

4. A brake assembly comprising a rotatable brake drum, two brake shoes each having its ends lying on a substantially horizontal line, means for substantially simultaneously applying force to both ends of both shoes tending to move them toward the brake drum and for receiving anchoring torque of the shoes during brake application, and auxiliary brake applying means for moving one end of each shoe toward the brake drum, said auxiliary brake applying means including a substantially vertical thrust link pivoted on one shoe and having an abutment adjacent the other shoe, an abutment on the other shoe, a wedge movable between the two abutments on a substantially horizontal line for spreading the shoes when pulled, and manually controllable means for pulling the wedge to spread the shoes.

5. A brake assembly comprising a rotatable brake drum, two individually shiftable brake shoes each having its end lying on a substantially horizontal line, combined anchoring and applying means for substantially simultaneously applying force to both ends of both shoes tending to move them toward the brake drum and for receiving anchoring torque of the shoes during brake application, and auxiliary brake means for moving one end of each shoe toward the brake drum, said auxiliary brake means including a substantially vertical thrust link pivoted on one shoe, a wedge movable on a substantially horizontal line between the thrust link and the other shoe for spreading the shoes when pulled, and a cable for pulling the wedge to spread the shoes.

6. A brake assembly comprising a rotatable brake drum, two brake shoes each having its ends lying on a substantially horizontal line, service means for applying force to the shoes tending to move them against the brake drum and auxiliary brake applying means for moving the shoes against the brake drum, said auxiliary brake applying means including a substantially vertical thrust link pivoted on one shoe and having an abutment adjacent the other shoe, an abutment on the other shoe, a wedge movable between the two abutments on a substantially horizontal line for spreading the shoes when pulled, and manually controllable means for pulling the wedge to spread the shoes.

7. For use with a brake assembly comprising a rotatable brake drum, two individually shiftable brake shoes adapted to anchor at either end according to the direction of drum rotation, each having a rim and a web in a plane normal to the rim, and service brake means for applying force to move the shoes toward the brake drum, auxiliary brake means for moving one end of each shoe toward the brake drum including a thrust link pivoted on one shoe and having an abutment adjacent the other shoe, the flat surface of the thrust link lying in a plane parallel to the plane of the shoe webs and the abutment being normal to the flat surface of the link, an abutment on the web of the other shoe normal to said web, a wedge between the two abutments for spreading the shoes when moved in a given direction, and manually controllable means for pulling the wedge to spread the shoes.

8. For use with a brake assembly comprising a rotatable brake drum, two individually shiftable brake shoes adapted to anchor at either end according to the direction of drum rotation, each having a rim and a web in a plane substantially normal to the rim, and service brake means for applying force to move the shoes toward the brake drum, auxiliary brake means for moving one end of each shoe toward the brake drum including a thrust link pivoted on one shoe and having an abutment adjacent the other shoe, the flat surface of the thrust link lying in a plane parallel to the plane of the shoe webs and the abutment being substantially normal to the flat surface of the link, an abutment on the web of the other shoe substantially normal to said web, a wedge between the two abutments for spreading the shoes when moved in a given direction, and manually controllable means for pulling the wedge to spread the shoes.

9. For use with a brake assembly comprising a rotatable brake drum, two individually shiftable brake shoes each having its ends on a substantially horizontal line and each having a rim and web portion, anchoring means for receiving anchoring torque of the shoes during brake application, and applying means for simultaneously applying force to both shoes tending to move them toward the brake drum, auxiliary brake means for moving one end of each shoe toward the brake drum including a substantially vertical thrust link pivoted on one shoe and having an abutment adjacent the other shoe, said thrust link lying in a plane parallel to the plane of the shoe webs and said abutment extending laterally from the plane of the thrust link and shoe webs, an abutment on the web of the other shoe also extending laterally from the plane of the shoe webs, a wedge movable between the two abutments on a substantially horizontal line for spreading the shoes when pulled, and a manually controllable means for pulling the wedge to spread the shoes.

10. For use with a brake assembly comprising a rotatable brake drum, two individually shiftable brake shoes each having its ends on a substantially horizontal line, anchoring means for receiving anchoring torque of the shoes during brake application, and service applying means for simultaneously applying force to both shoes tending to move them toward the brake drum, auxiliary brake means for moving one end of each shoe toward the brake drum including a substantially vertical thrust link pivoted on one shoe and having an abutment adjacent the other shoe, an abutment on the other shoe, a wedge movable between the two abutments on a substantially horizontal line for spreading the shoes when pulled, and manually controllable means for pulling the wedge to spread the shoes.

RICHARD T. BURNETT.